United States Patent [19]

Lee et al.

[11] Patent Number: 4,793,954
[45] Date of Patent: Dec. 27, 1988

[54] SHEAR PROCESSING THERMOPLASTICS IN THE PRESENCE OF ULTRASONIC VIBRATION

[75] Inventors: Biing-Lin Lee, Broadview Heights; Cameron Cranston, Wadsworth, both of Ohio

[73] Assignee: The B. F. Goodrich Company, Akron, Ohio

[21] Appl. No.: 86,119

[22] Filed: Aug. 17, 1987

[51] Int. Cl.$^4$ .............................................. B29C 47/12
[52] U.S. Cl. ........................................ 264/23; 264/70; 264/108; 524/577; 524/582; 524/585
[58] Field of Search ........................... 264/23, 70, 108; 524/577, 582, 585

[56] References Cited

U.S. PATENT DOCUMENTS

| 3,071,809 | 1/1963 | Lerch | 264/23 |
| 3,194,855 | 7/1965 | Jones | 264/70 |
| 3,233,012 | 2/1966 | Bodine | 264/23 |
| 3,619,429 | 11/1971 | Torigai | 264/23 |

FOREIGN PATENT DOCUMENTS

| 0134052 | 2/1979 | Fed. Rep. of Germany | 264/23 |
| 0138523 | 11/1979 | Fed. Rep. of Germany | 264/23 |
| 0532529 | 5/1975 | U.S.S.R. | 264/23 |
| 0706250 | 12/1979 | U.S.S.R. | 264/23 |

Primary Examiner—John C. Bleutge
Assistant Examiner—David Buttner
Attorney, Agent, or Firm—James R. Lindsay; Daniel J. Hudak

[57] ABSTRACT

Various processing advantages are gained when ultrasonic vibration is applied to a thermoplastic processing apparatus such as an extruder or an injection molding device. Such advantages include improved flow rate, reduced processing pressure, and consequently reduced processing temperature to mold or extrude the melted thermoplastic. The ultrasonic vibration is desirably applied to the die of the processing apparatus and in a direction longitudinal to the flow of the thermoplastic. Suitable thermoplastics include polystyrene and polyolefins.

4 Claims, 1 Drawing Sheet

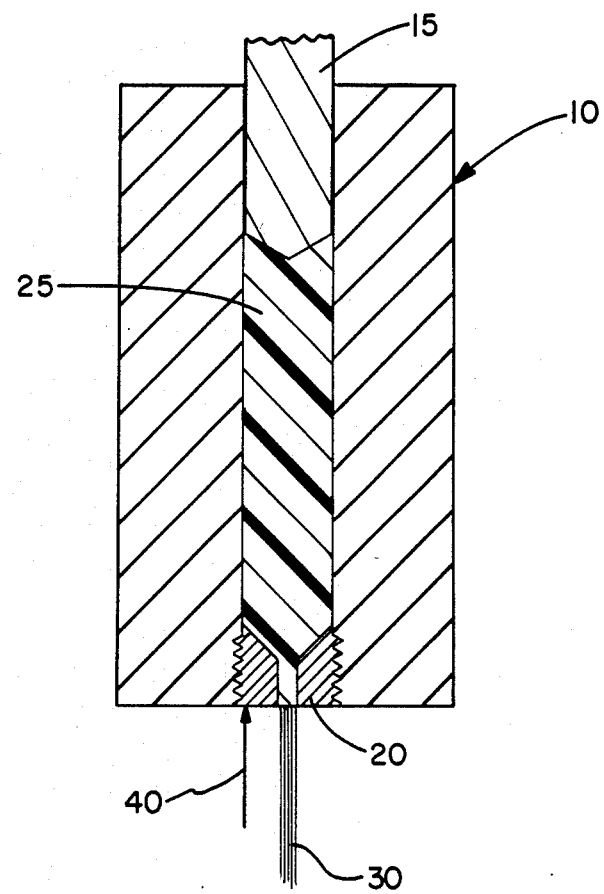

SHEAR PROCESSING THERMOPLASTICS IN THE PRESENCE OF ULTRASONIC VIBRATION

FIELD OF THE INVENTION

The present invention relates to imparting favorable processing conditions to thermoplastics when processed in an apparatus subjected to ultrasonic vibration.

BACKGROUND OF THE INVENTION

Heretofore, the use of ultrasonic vibration has been applied to a limited number of areas such as ultrasonic cleaning, ultrasonic non-destructive testing, signal processing, ultrasonic cavitation, ultrasonic atomization, and the like. With regard to polymers, ultrasonic vibration has been generally limited to decomposing polymers, welding plastics, and molding of polymers by creating enough friction to melt the polymer powders.

SUMMARY OF THE INVENTION

It is an aspect of the present invention to utilize ultrasonic vibration in molten thermoplastic shearing operations such as extrusion and injection molding to realize improved processing properties such as reduced viscosity, improved melt flow, and reduced pressure. Furthermore, the onset of melt fracture is delayed until a higher shear rate is reached. The present invention is also applicable to thermoplastics having fillers or reinforcing fibers therein. In general, the aspects of the various invention will be better understood by reference to the following detailed description.

BRIEF DESCRIPTION OF THE DRAWINGS

FIG. 1 is a diagramatical view showing the application of ultrasonic vibration to a thermoplastic processing apparatus.

DETAILED DESCRIPTION OF THE INVENTION

The various thermoplastic compositions which can be utilized in the present invention are those which have shear thinning characteristics in the presence of a shear applying apparatus so that when ultrasonic vibration is applied to the apparatus, and hence indirectly to the thermoplastic, the thermoplastic has improved flow rates and/or reduced viscosities. That is, the viscosity is reduced or lowered as the shear is increased when the thermoplastic is in a molten state. The flow throughput is thus increased as the thermoplastic is expelled from a shear processing device. The application of ultrasonic vibration does not always fully impart such desired properties to all thermoplastics. For example, polyvinyl chloride compounds and copolymers thereof and the various types of rubber compound gain little flow enhancement, etc., when subjected to ultrasonic vibration. While not fully understood, it is thought that only thermoplastic compounds which tend to adhere to the wall of the flow channel of the processing apparatus have improved processing advantages when subjected to ultrasonic vibration. Examples of such adhesive-like thermoplastics include styrenic type polymers, the various polyolefins made from monomers having a total of from about 2 to about 6 carbon atoms and preferably 2 or 3 carbon atoms, for example polyethylene, polypropylene, and the like. By the term "styrenic type polymers", it is meant that polymers such as polystyrene, poly(alphamethylstyrene), a copolymer of styrene-acryconitrile, and the like, can be utilized with polystyrene being preferred. The polymer can generally be of any molecular weight.

Various shear processing equipment or apparatus can be utilized in which shear is applied to the melt stage of the above-noted shear thinning thermoplastics. That is, any apparatus can be utilized wherein a shear thinning thermoplastic is subjected to shear. By the term "melt stage", it is meant that the thermoplastic has been heated to a temperature above its melting point and hence is molten or liquid. Such apparatus generally include injection molding machines or operations, extrusion machines or operations such as profile extrusion machines, and the like. Such machines and the operation thereof are generally known to the art as well as to the literature and hence will not be described in detail. Briefly, they generally relate to mixing and heating a thermoplastic under shear conditions such that the polymer is melted ad pushed, forced, etc., out of the apparatus through a die under pressure.

According to the concepts of the present invention, although the entire apparatus can be subjected to ultrasonic vibration, the vibration desirably is applied to the end portion or melt stage of the apparatus. That is, vibration is applied to the polymer contact surfaces, especially in the forming section of the apparatus. Preferably, vibration is applied to the forming die of the apparatus. Naturally, the die can be of any size or shape, to form a suitable article such as a ribbon or in the case of an injection molder, to form a suitable aperture from which the polymer can be injected into a mold. The attachment of the ultrasonic vibration creating device to the die or the shear processing apparatus can be in accordance with any conventional manner. Hence, the ultrasonic vibration device can be attached by a fastener, for example screws or bolts, and the like.

It is an important aspect of the present invention that the ultrasonic vibrations be applied to the apparatus substantially longitudinal to the direction of the polymer melt flow to achieve improved processing properties. In contrast, application of the vibration in a direction transverse to the flow generally does not result in any substantial processing improvements. Thus, the vibrations are generally applied at an angle of 45 degrees or less, desirably 15 or 10 degrees or less to the direction of the polymer flow with approximately a nil, that is a head on or tail on angle, and preferably a few degrees, that is from about 0 or 1 to about 5 degrees.

The application of ultrasonic vibration to the processing device and hence to the thermoplastic results in a variety of shear processing improvements. The tendency of various adhesive, sticky, tacky polymers which would adhere to the shearing apparatus or the die is greatly reduced. The viscosity of the polymer is also reduced so that the polymer flows more readily. That is, the flow rate of the polymer is improved or increased. The extrudate swell is also drastically reduced as is the required pressure to pump the melted polymer. Since the flow rate or throughput is generally increased, the processing temperature need not be as high and can also be reduced. The net result is a much more readily processable polymer or a shearing apparatus having improved shear processability. Another improved processing result is that the onset of melt fracture, that is the production of an extrudate with rough or wavy surfaces, is extended to a much higher shear rate. The important implication of this unique advantage is that the extrusion throughput with regard to maintaining smooth surfaces is increased.

Any ultrasonic vibration generating device can be utilized which emits vibration of an amplitude and frequency desired for use in the present invention. A wide range of ultrasonic frequencies can be utilized. For example, from about 10,000 to about 40,000 Hertz can be utilized with from about 15,000 to about 25,000 Hertz being desired. The mechanical amplitude of the frequency can also vary over a wide range and generally is dependent upon the type of ultrasonic vibration apparatus utilized. Generally, any ultrasonic vibration device or machine can be utilized. An example of a specific machine is a Branson Portable Spot Welder, Model GK-4, manufactured by Branson Sonic Power, Co.

The various thermoplastics of the present invention can be processed utilizing conventional processing aids, additives, compounding agents, and the like. Such compounds as well as the amounts thereof are conventional and also known to the art and to the literature and include items such as antioxidants, colorants, flame retardants, lubricants, heat stabilizers, mold release agents, plasticizers, processing aids, ultraviolet light stabilizers, and the like.

Moreover, large amounts of fillers and/or reinforcing agents can be added. For example, up to about 30% by volume of various fillers such as carbon black, calcium carbonate, talc, silica, and the like, can be added with desirably the amount of carbon black and the silica as being from about 10% to about 20% by volume. Various reinforcing fibers can be added such as fiberglass, graphite, aramide, polyamide, and the like. Generally up to about 30% by volume of the reinforcing fibers can be added with up to about 20% by volume being desired.

The processed material produced by the present invention can be utilized in previously known applications. For example, polyethylene can be utilized to form pipes, film, etc. Polystyrene can be utilized for film, air-conditioner grilles, etc.

As noted, generally any shear applying apparatus can be utilized according to the present invention and such is generally shown in a schematic view as set forth in FIG. 1. The extrusion apparatus is generally indicated by the number 10*. The apparatus has a heater therein, not shown, which applies heat to a thermoplastic material 25* and melts the same. A plunger 15* serves to force or push the molten polymer through the shear processing apparatus through a suitable die 20*. The extrudate 30* generally expands upon leaving the shear processing apparatus. In accordance with the present invention, an ultrasonic vibration 40* is applied in a direction longitudinal to the flow for the thermoplastic material. As shown in FIG. 1, the ultrasonic vibration is applied to the die in a direction extending inwardly to the apparatus at a direction essentially parallel to the extrudate flow direction.

The invention will be better understood by reference to the following examples.

EXAMPLES

The experiment was conducted using an Instron Capillary Rheometer, Flow Model TTC, manufactured by Instron Engineering Corporation., Canton, Mass. A die with diameter 0.06 inch and length 0.5 inch was used. The ultrasonic vibration was applied vertically to the die exit (i.e. parallel to the flow direction), see FIG. 1.

The basic component for ultrasonic power supply used was a Banson Model 130 or 160. This solid-state power supply converts conventional 50-60 Hertz electrical current into 20,000 Hertz electrical energy. The 20,000 Hertz electrical energy is fed to the electrostrictive converter which transforms the electrical energy into 20,000 Hertz mechanical energy. The 20,000 Hertz mechanical vibrations from the preconverter are focused, amplified and transmitted by a horn. The horn vibrates efficiently at 20,000 Hertz. This horn then transmits the ultrasonic vibration to the forming die as shown in FIG. 1.

The thermoplastic polymer evaluated was polystyrene (Gulf EC2100) having a number average molecular weight of about 50,000. The temperature for extrusion was 175° C. The shear viscosity of this polymer exhibited shear thinning characteristics.

RESULTS

1. Extrusion Pressure: The pressure required for extrusion at a given constant flow rate was recorded in a chart recorder. It was observed that upon the application of the ultrasonic vibration as shown in FIG. 1, the pressure required for extruding the polystyrene was reduced by 10% to 23% depending on the extrusion flow rate (see the attached Table). Namely, the application of ultrasonic vibration to the exit end of a forming die appreciably improved the flow rate - pressure characteristic of extrusion. It was also noted that the transversal application of ultrasonic vibration did not reduce the pressure required to extrusion.

2. Extrudate Swell: It is important to note that the extrudate swell (or extrudate diameter) was reduced upon the longitudinal application of ultrasonic vibration (see the attached Table). However, again, no appreciable change in extrudate diameter was observed when the ultrasonics was applied trasversely.

3. Extrudate Waviness: The extrusion flow rate for practical operation should be operated at a shear rate range in which a smooth surface of extrudate could be obtained. The onset of the extrudate surface roughness is always the limitation of extrusion throughput. It was noted that upon the application of longitudinal ultrasonic vibration, the onset of extrudate surface roughness is delayed until higher flow rates are achieved. In addition to the reduction of extrusion pressure, the practical production throughput can also be increased.

TABLE I

Effect of Ultrasonic Vibration on Extrusion of Polystrene
The Die diameter was 0.6 inch, the length was 0.5
inch, and the extrusion temperature was 175° C.

| SHEAR RATE (SEC$^{-1}$) | FLOW RATE IN$^3$/MIN | ULTRASONIC VIBRATION | EXTRUDATE DIAMETER INCH | EXTRUSION PRESSURE (PSI) | REDUCTION OF EXTRUSION PRESSURE DUE TO ULTRASONIC VIBRATIONS (%) |
|---|---|---|---|---|---|
| 17 | 0.022 | No | 0.078 | 700 | — |
| 17 | 0.022 | Yes | 0.062 | 630 | 10 |
| 85 | 0.110 | No | 0.083 | 1250 | — |

TABLE I-continued

Effect of Ultrasonic Vibration on Extrusion of Polystrene
The Die diameter was 0.6 inch, the length was 0.5 inch, and the extrusion temperature was 175° C.

| SHEAR RATE (SEC$^{-1}$) | FLOW RATE IN$^3$/MIN | ULTRASONIC VIBRATION | EXTRUDATE DIAMETER INCH | EXTRUSION PRESSURE (PSI) | REDUCTION OF EXTRUSION PRESSURE DUE TO ULTRASONIC VIBRATIONS (%) |
|---|---|---|---|---|---|
| 85 | 0.110 | Yes | 0.080 | 990 | 20 |
| 420 | 0.552 | No | Wavy | 2350 | — |
| 420 | 0.552 | Yes | Wavy | 1800 | 23 |

While in accordance with the patent statutes, a best mode and preferred embodiment has been set forth, the scope of the invention is not limited thereto, but rather by the scope of the attached claims.

What is claimed is:

1. A process for improving the processability of a shear thinning thermoplastic melt, comprising the steps of:
   melting the shear thinning thermoplastic in a shear processing apparatus containing a die, said shear thinning thermoplastic being a styrenic type polymer or a polyolefin, said polyolefin made from monomers having from 2 to 6 carbon atoms, said apparatus being an injection molding apparatus or extrusion apparatus;
   applying ultrasonic vibration to said die at a frequency of 10,000 to 40,000 hertz at a substantially longitudinal flow angle of about 15 degrees or less to said shear processing apparatus whereby the shear processability of said thermoplastic is improved; and
   injection molding or extruding said thermoplastic at a reduced viscosity and temperature.

2. A process according to claim 1, wherein said styrenic type polymer is polystyrene, wherein said polyolefin is polyethylene or polypropylene, wherein said ultrasonic vibration frequency is from about 15,000 to about 25,000 Hertz, and wherein said substantially longitudinal flow angle is about 5 degrees or less.

3. A process according to claim 2, wherein said ultrasonic vibration is applied to said die at a flow angle of about 5 degrees or less.

4. A process according to claim 1, wherein said shear thinning thermoplastic contains up to 30% by volume of a fiber, a filler, or combinations thereof.

* * * * *